United States Patent [19]

Campbell et al.

[11] 4,386,135

[45] May 31, 1983

[54] STABLE SILICONE-COATED RELEASE LINER FOR PRESSURE-SENSITIVE ADHESIVE SHEETS

[75] Inventors: Karen J. Campbell, Anoka; Jack L. Evans, St. Paul, both of Minn.

[73] Assignee: Minnesota Mining and Manufacturing Company, St. Paul, Minn.

[21] Appl. No.: 338,473

[22] Filed: Jan. 11, 1982

[51] Int. Cl.³ .................. B32B 27/06; C08G 77/06
[52] U.S. Cl. .................. 428/447; 427/372.2; 427/387; 427/395; 428/40; 428/352; 428/354; 428/452; 528/15; 528/31; 528/32
[58] Field of Search .................. 528/15, 31, 32; 428/352, 447, 452, 40, 354; 427/387, 395, 372.2

[56] References Cited

U.S. PATENT DOCUMENTS

| | | | |
|---|---|---|---|
| Re. 24,906 | 12/1960 | Ulrich | 206/59 |
| 2,823,218 | 2/1958 | Speier | 528/15 |
| 3,061,567 | 10/1962 | Keil | 260/29.2 |
| 3,159,601 | 12/1964 | Ashby | 260/46.5 |
| 3,188,299 | 6/1965 | Chalk | 260/46.5 |
| 3,188,300 | 6/1965 | Chalk | 260/46.5 |
| 3,220,972 | 11/1965 | Lamoreaux | 260/46.5 |
| 3,344,111 | 9/1967 | Chalk | 260/46.5 |
| 3,715,334 | 2/1973 | Karstedt | 260/46.5 |
| 3,814,731 | 6/1974 | Nitzsche | 528/15 |
| 3,900,617 | 8/1975 | Grenoble | 528/15 |
| 4,154,714 | 5/1979 | Hockemeyer | 528/15 |
| 4,184,006 | 1/1980 | Hockemeyer | 428/447 |
| 4,216,252 | 8/1980 | Moeller | 427/387 |
| 4,256,870 | 3/1981 | Eckberg | 528/15 |

*Primary Examiner*—Ellis P. Robinson
*Attorney, Agent, or Firm*—Cruzan Alexander; Donald M. Sell; Richard E. Brink

[57] ABSTRACT

Silicone-coated release liner which, even after exposure to light in the presence of moisture, heat or both, displays release properties of less than 20 g/cm width with respect to pressure-sensitive adhesive tape. The coating contains noble metal, and the silicone polymer has substantially no residual ethylenic unsaturation. The silicone polymer is prepared by pre-reacting polydimethyl siloxane with a noble metal catalyst before adding polymethylhydrosiloxane crosslinker.

10 Claims, No Drawings

STABLE SILICONE-COATED RELEASE LINER FOR PRESSURE-SENSITIVE ADHESIVE SHEETS

BACKGROUND OF THE INVENTION

This invention relates to release liners for normally tacky and pressure-sensitive adhesive, and is particularly concerned with an improved silicone-coated release liner.

For many years it has been common practice to protect the adhesive-coated face of normally tacky and pressure-sensitive adhesive sheet material with a removable release liner. Such liners typically include paper or other base sheet material having on at least one face a release coating to which pressure-sensitive adhesive adheres less firmly than it does to the tape backing on which it is coated. A wide variety of release coatings have been employed, but the lowest release values have typically been obtained when a silicone polymer is employed for this purpose.

In the early development of silicone-coated release liners, an organic solvent solution of relatively high molecular weight, viscous OH-terminated polydimethyl siloxane, polymethylhydrosiloxane crosslinking agent, and metal salt catalyst, such as dibutyl tin dilaurate or lead octoate, was applied to a sheet material and heated to evaporate the solvent and crosslink the polymer through its OH groups, into a tough silicone coating; see, e.g., U.S. Pat. No. 3,061,567. When applied to the adhesive surface of pressure-sensitive adhesive tape, such liners provide low initial release values and maintain satisfactorily low release values even after being in contact with the adhesive for weeks or months. Stable release values are achieved even if the cured silicone surface of the liner has previously been exposed to natural or artificial light under ambient temperature and humidity conditions for substantial periods of time. Such exposure may occur in a drying oven when web breakage or stoppage occurs. It may also occur when the opposite side of the sheet is subsequently coated with silicone in the same manner to provide a two-surfaced release liner.

In more recent times, the evaporation of organic solvent into the atmosphere has been prohibited by air pollution standards, necessitating the installation of expensive scrubbers or solvent recovery systems. As a result, manufacturers have turned to the use of solvent-free reactants in preparing silicone release liners. A 100% solids blend of low molecular weight, low viscosity vinyl-functional polydimethyl siloxane, polymethylhydrosiloxane crosslinking agent, and noble metal hydrosilation catalyst is coated on the base sheet material and thereafter heated to effect cure by crosslinking through the vinyl groups, forming a tough solid silicone coating; see, e.g., U.S. Pat. No. 4,216,252. While this method is less expensive and more convenient than the previous method of preparing silicone release liners, products prepared in this manner (especially liners having silicone coatings on both faces) have suffered from a serious disadvantage, the reason for which was not understood.

Like the liners in which the silicone coating was applied from solvent, liners made with solvent-free silicone systems provide release values which are initially satisfactory. This fact is readily verified by the quality control tests performed by liner manufacturers, where a strip of pressure-sensitive adhesive tape is adhered to a liner using a weighted roller and stripped therefrom within a few minutes under controlled conditions while measuring the force required for removal. Unfortunately, however, the low initial release sometimes—but not always—begins to increase within 30 minutes after the liner is placed in contact with the adhesive, rising sharply to an intolerably high value in an exponential curve over the first week or so. As a result of the unpredictability of performance, liners made with solvent-free silicone systems (especially liners coated with silicone on each face) have been the cause of many customer complaints. Neither the reason for this erratic performance nor any method of coping with it has been recognized.

BRIEF SUMMARY

Applicants have now ascertained those ambient conditions which cause release values of solventless-coated silicone liners to increase after application to the adhesive surface of pressure-sensitive adhesive sheet material. Even more significantly, applicants have devised silicone release liners, prepared using solvent-free silicone systems, which consistently and predictably maintain satisfactorily low release values after being in contact with pressure-sensitive adhesive sheet material for weeks, or even months.

Applicants' invention is based on the discovery that the previously unexplained increase in release value results from the coexistence of two conditions, viz., (1) the presence of residual vinyl groups in the silicone coating and (2) the exposure of the silicone coating to conditions of heat, light or humidity for a significant period of time prior to use as a release liner. Without being bound thereby, applicants believe that the residual vinyl groups remaining in the cured silicone coating, aided by the noble metal catalyst remaining in the coating, react with atmospheric oxygen or moisture to form hydroxide, peroxide or other polar groups which tend to bond firmly to pressure-sensitive adhesives.

Expressed most simply, the invention comprises a release liner, which, even after exposure to natural or artificial light in the presence of moisture vapor, displays release properties of less than 20 g/cm width (preferably less than 10 g/cm width) with respect to normally tacky and pressure-sensitive adhesive tape. The liner comprises a self-supporting sheet material having bonded to at least one face a thin layer of cured silicone polymer containing noble metal and having substantially no residual ethylenic unsaturation. The cured silicone polymer is the noble metal-catalyzed reaction product of solvent-free liquid components consisting essentially of (1) terminally unsaturated polydimethyl siloxane (of di-, tri-, or tetra-branched structure, generically referred to as "star" configuration) having the empirical formula

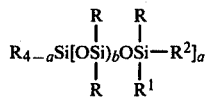

in which a is 2, 3 or 4, b is 15–100 (preferably 25–75), R and $R^1$ (which may be either the same or different) are monovalent hydrocarbon radicals free of aliphatic unsaturation (preferably phenyl or methyl, and most preferably methyl), at least 50 mole percent of said radicals being methyl and the remainder being alkyl, cycloalkyl, aryl or aralkyl, and $R^2$ is a monovalent ethylenically unsaturated aliphatic hydrocarbon radical having 2 to 6 carbon atoms (preferably vinyl or allyl, and most preferably at least predominantly vinyl), and (2) polymethylhydrosiloxane crosslinking agent having the empirical formula

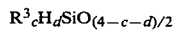

in which $R^3$ is bonded to a silicon atom and is a monovalent aliphatic or aromatic hydrocarbon radical or the halogenated derivative of such a radical, c is 0 to 3 (preferably 0.5 to 2.0), and d is 0.005 to 2.0, the sum of c plus d being 0.8 to 3, there being at least 2 silicon-bonded hydrogen atoms present per molecule, the ratio of silicon-bonded hydrogen in (2) to silicon-bonded ethylenically unsaturated radicals in (1) being from about 1:1 to about 20:1 (preferably from about 1.1 to 2.5).

While it is generally preferred that R and R' contain only alkyl or cycloalkyl (especially methyl) substituents, it has been found that at least 10% of these groups can be replaced by phenyl or aralkyl groups with no significant effect on performance of the ultimate silicone release liner.

In another aspect, the invention provides the method of making the release sheet just described comprising the steps of (a) blending solvent-free liquid polydimethylsiloxane having the structural formula

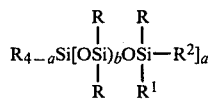

in which a is 2, 3 or 4, b is 15–100 (preferably 25–75), R and $R^1$ (which may be either the same or different) are monovalent hydrocarbon radicals free of aliphatic unsaturation (preferably phenyl or methyl, and most preferably methyl), at least 50 mole percent of said radicals being methyl and the remainder being alkyl, cycloalkyl, aryl or aralkyl, and $R^2$ is a monovalent ethylenically unsaturated aliphatic hydrocarbon radical having 2 to 6 carbon atoms (preferably vinyl or allyl, and most preferably at least predominantly vinyl), with noble metal (preferably platinum) catalyst in an amount equal to 10–200 (preferably 50–150) parts by weight of platinum per 1,000,000 parts of polymer, and (b) maintaining the blend of polydimethylsiloxane and catalyst at a temperature between 20° and 80° C. (preferably between 25° C. and 70° C.) for a time sufficient to cause association of the platinum with the vinyl groups of the polymer, (c) mixing into the blend, solvent-free liquid polymethylhydrosiloxane crosslinking agent having the empirical formula

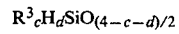

in which $R^3$ is bonded to a silicon atom and is a monovalent aliphatic or aromatic hydrocarbon radical or the halogenated derivative of such a radical, c is 0 to 3 (preferably 0.5 to 2.0), and d is 0.005 to 2.0, the sum of c plus d being 0.8 to 3, there being at least 2 silicon-bonded hydrogen atoms present per molecule, the ratio of silicon-bonded hydrogen in (2) to silicon-bonded ethylenically unsaturated radicals in (1) being from about 1:1 to about 20:1 (preferably from about 1.1 to 2.5). to obtain a coating formulation, (d) coating a thin layer of the formulation on a self-supporting backing sheet, and (e) heating the coated sheet for a time and temperature sufficient to effect cure by reaction of the polydimethylsiloxane and polymethylhydrosiloxane crosslinking agent.

To determine whether cure has taken place, two simple empirical tests can be employed. If one rubs the coating with his thumb, the coating is deemed "cured" if it neither feels oily nor is readily rubbed off. An alternative test is to place a strip of pressure-sensitive adhesive tape in contact with the coating, rub it down, remove it, double the tape on itself so that the adhesive surface is in contact with itself, and then separate the adhesive surfaces; if separation occurs only with difficulty, the coating is considered "cured", while if separation occurs easily, curing is insufficient.

Desirably, a cure inhibitor such as diallyl maleate is incorporated in the coating formulation to extend pot life, the inhibitor being of a type which is rendered inoperative by the heat employed in the curing step. Other suitable cure inhibitors are disclosed in U.S. Pat. Nos. 3,188,299, 3,188,300, 3,344,111 and 4,216,252.

The viscosity of the coating composition should be in the approximate range of 100–1,000 cps, preferably 200–500 cps. Lower viscosity formulations tend to soak into the paper base for release liners, leaving insufficient silicone polymer at the surface. Higher viscosity solutions are hard to coat without applying a thickness so great as to result in excessive cost.

It is essential that the liquid polydimethylsiloxane be essentially free from olefinic unsaturation other than on terminal silicon atoms, because unsaturated groups attached to silicon atoms intermediate the ends of the polymer do not normally react readily with the crosslinking agent but tend to cause the subsequent increase in release value which is to be avoided. Even if unsaturated groups are present only at terminal positions, however, step "(b)" is required to make sure that essentially all such groups (vinyl, allyl, etc.) react with the crosslinking agent. Residual unsaturation, no matter where it appears, results in the unacceptable increase in release value. The duration of step "(b)" may range from, e.g., 5 minutes to 2 hours, being dependent on both the specific catalyst employed and the temperature, as will be illustrated subsequently in the detailed description of the invention.

The exact nature of what occurs in step "(b)" is conjectural. By way of possible explanation, but without being bound thereby, applicants suggest that the noble metal may split off from the catalyst and complex with each terminal vinyl (or other unsaturated) group of the polydimethylsiloxane, rendering it more reactive than would otherwise be the case.

Various noble metals catalyze the hydrosilation crosslinking which occurs in practicing the invention, e.g., platinum, rhodium, iridium, palladium and compounds thereof. Platinum catalysts are generally preferred because of their support cost-effectiveness.

DETAILED DESCRIPTION

Understanding of the invention will be enhanced by referring to the following examples, in which all parts are by weight unless otherwise noted.

EXAMPLE 1

A silicone-catalyst blend containing 100 parts of platinum metal per 1,000,000 parts of silicone was prepared by mixing 100 grams of a silicone polymer having the structure

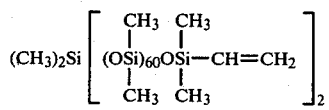

with 0.1 gram of an isopropanol solution of chloroplatinic acid catalyst containing 10% platinum; see U.S. Pat. No. 2,823,218, Example 1. The blend was heated in a 500-ml round-bottomed flask affixed to a flash evaporator unit for 120 minutes at 60° C. and a pressure of 25 mm Hg, producing a catalyzed silicone having enhanced catalytic activity.

The catalyzed silicone was then transferred to a 500-ml Erlenmeyer flask, cooled to 25° C., 0.25 gram diallyl maleate polymerization inhibitor added, and the mixture stirred for 15 minutes. Next, there was added 2.5 grams of polymethylhydrosiloxane crosslinker having the structure

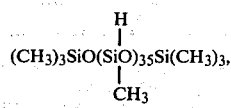

available from Dow Corning Corporation under the trade designation DC-1107. The resultant blend, having a silicon hydride:vinyl mole ratio of 1.8:1, was stirred for 15 minutes to yield a coating composition. The silicone coating composition was then applied to 60-lb brown super-calendered kraft paper (weighing about 105 g/m$^2$) with a 3-roll differential speed offset gravure coater, equipped with a 200 line/inch (about 79 line/cm) gravure cylinder, a rubber transfer roll, and a steel back-up roll; the transfer and back-up rolls turned at a surface speed of 45 ft/min (13.7 m/min), and the gravure cylinder at a surface speed of 13.5 ft/min (4.1 m/min). The resultant coating weight was 1 g/m$^2$. (Differential speed coating of silicones is described in U.S. Pat. No. 4,216,252.)

The silicone-coated paper was then cured for 60 seconds at 150° C. in a circulating air oven to form a release liner. After curing, one portion of the liner was tested as follows:

A 25% solids 70:30 heptane:isopropanol solution of pressure-sensitive adhesive comprising a 95.5:4.5 isooctyl acrylate:acrylic acid copolymer, as described in U.S. Pat. No. Re. 24,906, was applied at a coating weight of 32 g/m$^2$ (dry weight) to the silicone-coated surface and dried for 5 minutes at 70° C. in a circulating air oven, after which 38-micrometer biaxially oriented polyethylene terephthalate (PET) film was laminated to the surface. The resultant laminate was cut into 2.5×25 cm strips; the strips were attached to a horizontal plate with the PET film side up, and the release value measured while pulling the PET film with adhesive adhering thereto away from the silicone-coated surface at an angle of 180° and a stripping speed of 230 cm/min. This release value was 9 gram/2.5 cm width, or 3.5 g/cm width. Other 2.5×25 cm strips cut from the same laminate were aged six days at 50% relative humidity and room temperature before testing in the same manner, the release value obtained being 4.4 g/cm width.

A second portion of the liner was placed on a horizontal surface so as to expose the cured silicone coating to ambient room conditions (circulating air at 22° C., 50% relative humidity, 125 cm distant from a bank of 40 watt fluorescent lamps) for a period of 4 hours. After the 4-hour exposure, the "activated" silicone surface was coated with adhesive, dried, laminated with PET film, aged for 6 days at 50% relative humdity, and room temperature, and tested as above. This release value was 5.5 g/cm width.

A control was prepared and tested in exactly the same manner as the preceding example except that the "enhancement" step of pre-reacting the silicone polymer with the catalyst was omitted. The initial release value was 2.7 g/cm width; after activation, the release value was 50.4 g/cm width.

The following examples, prepared in the same manner as Example 1, show the use of the other silicone polymer starting material of the type defined by structure (1) above.

TABLE I

| Example | Silicone Polymer | Mole Ratio SiH:Vinyl | Release Value, g/cm. Width Initial | After "Activation" |
|---|---|---|---|---|
| 2 | $(CH_3)_2Si[(OSi)(CH_3)_2)_{25}OSi(CH_3)_2-CH=CH_2]_2$ | 1.8 | 3.0 | 8.4 |
| 3 | $(CH_3)_2Si[(OSi)(CH_3)_2)_{50}OSi(CH_3)_2-CH=CH_2]_2$ | 1.8 | 3.4 | 4.4 |
| 4 | $(CH_3)_2Si[(OSi)(CH_3)_2)_{75}OSi(CH_3)_2-CH=CH_2]_2$ | 1.8 | 3.0 | 4.8 |
| 5 | $CH_3Si[(OSi)(CH_3)_2)_{50}OSi(CH_3)_2-CH=CH_2]_3$ | 1.8 | 0.7 | 7.5 |

TABLE I-continued

| Example | Silicone Polymer | Mole Ratio SiH:Vinyl | Release Value, g/cm. Width Initial | After "Activation" |
|---|---|---|---|---|
| Control (Not enhanced) | $CH_3Si\left[(OSi)_{50}O\underset{\underset{CH_3}{\|}}{\overset{\overset{CH_3}{\|}}{Si}}-CH=CH_2\right]_3$ where $(OSi)_{50}$ has $CH_3, CH_3$ substituents | 1.8 | 11.1 | 228 |
| 6 | $Si\left[(OSi)_{50}O\underset{\underset{CH_3}{\|}}{\overset{\overset{CH_3}{\|}}{Si}}-CH=CH_2\right]_4$ | 1.8 | 1.2 | 13.0 |
| Control (Not enhanced) | $Si\left[(OSi)_{50}O\underset{\underset{CH_3}{\|}}{\overset{\overset{CH_3}{\|}}{Si}}-CH=CH_2\right]_4$ | 1.8 | 21.3 | 346 |

Examples 2, 3 and 4 show the effectiveness of divinyl-terminal silicone starting materials having a range of molecular weights. Examples 5 and 6 show trivinyl- and tetravinyl-terminated polymers and indicate the importance of the "enhancement" step.

The following examples, prepared in the same manner as Example 1, show the interrelationship of catalyst type and amount, time, and temperature in the enhancement step.

TABLE II

| Ex. | Catalyst* | ppm Pt | Time, min. | Temp, °C. | Initial | After Activation |
|---|---|---|---|---|---|---|
| 7 | A | 100 | 10 | 70 | 4.8 | 18.4 |
| Comparison A | A | 100 | 10 | 25 | 6.0 | 44.0 |
| Comparison B | A | 100 | 30 | 25 | 9.2 | 60.4 |
| 8 | A | 100 | 30 | 60 | 3.6 | 5.2 |
| 9 | A | 100 | 30 | 80 | 3.2 | 5.6 |
| Comparison C | A | 100 | 60 | 25 | 8.4 | 57.2 |
| 10 | A | 100 | 60 | 53 | 3.6 | 9.2 |
| 11 | A | 100 | 60 | 70 | 4.0 | 12.0 |
| Comparison D | A | 100 | 60 | 87 | 6.0 | 45.2 |
| 12 | A | 100 | 120 | 60 | 3.4 | 5.6 |
| 13 | A | 100 | 180 | 50 | 2.6 | 5.0 |
| 14 | B | 100 | 120 | 60 | 3.4 | 5.6 |
| Comparison E | B | 100 | 120 | 25 | 2.8 | 30.0 |
| 15 | C | 100 | 120 | 60 | 2.6 | 8.2 |
| Comparison F | C | 100 | 120 | 25 | 3.2 | 246.4 |
| 16 | D | 25 | 60 | 60 | 4.0 | 10.8 |
| Comparison G | D | 50 | 60 | 25 | 3.2 | 22.8 |
| 17 | D | 50 | 60 | 60 | 3.8 | 8.6 |
| 18 | D | 75 | 60 | 60 | 2.8 | 5.6 |
| 19 | D | 175 | 60 | 60 | 3.8 | 5.2 |
| 20 | E | 100 | 5 | 20 | 4.8 | 7.2 |
| 21 | E | 100 | 120 | 90 | 4.0 | 6.8 |

*Catalyst A - as described in Example 1.
Catalyst B - Reaction product of 1 part chloroplatinic acid hexahydrate and 10 parts octyl alcohol; see U.S. Pat. No. 3,220,972, Example 1.
Catalyst C - Reaction product of 1 part chloroplatinic acid hexahydrate and 95 parts ethyl alcohol; see U.S. Pat. No. 3,159,601, Example 1.
Catalyst D - $C_{12}H_8N_2(Pt)Cl_2 \cdot (CH_2 = CH_2)$ Catalyst E - 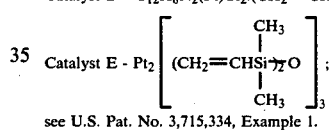

see U.S. Pat. No. 3,715,334, Example 1.

The following examples, made as in Example 1, show the effect of varying the amount of crosslinker to provide a range of silicon hydride:vinyl mole ratios.

TABLE III

| Example | SiH:Vinyl Mole Ratio | Release Value, g/cm Width Initial | After Activation |
|---|---|---|---|
| 22 | 0.99 | 3.4 | 18.2 |
| 23 | 1.10 | 5.2 | 11.0 |
| 24 | 1.35 | 3.6 | 4.8 |
| 25 | 1.80 | 3.0 | 5.2 |
| 26 | 2.70 | 3.8 | 6.2 |
| 27 | 3.00 | 4.2 | 7.8 |
| 28 | 3.50 | 4.4 | 7.0 |
| 29 | 4.00 | 4.2 | 11.0 |

This table shows that, while it is essential to have enough crosslinker present to ensure a theoretical stoichiometric reaction with the terminal vinyl groups, a considerable excess of crosslinker does not prove harmful. If, however, the amount of crosslinker is so great that the SiH:vinyl mole ratio is 5-6 or more, it is found that the residual SiH groups in the silicone release liner gradually react with pressure-sensitive adhesives placed in contact therewith, resulting in excessively high release values.

Bearing in mind the points just discussed, the number of SiH groups per molecule of fluid polymethylhydrosiloxane crosslinker is not especially critical. The following examples were made in the same manner as Example 1, holding the SiH:vinyl mole ratio constant but varying the crosslinker.

TABLE IV

| Example | SiH Groups Per Crosslinker Molecule | Release Value, g/cm Width Initial | After Activation |
|---|---|---|---|
| 30 | 2* | 3.0 | 9.0 |
| 31 | 4 | 2.6 | 6.4 |
| 32 | 10 | 3.4 | 4.8 |
| 33 | 35 | 3.0 | 5.2 |
| 34 | 69 | 2.6 | 6.0 |

*Crosslinked polymer cured 5 minutes at 150° C.

In Table V below, Comparison Examples I, J, K and L were made in the same manner as Example 1 except for the use of vinyl-terminated silicone starting materials having, in addition, several mid-chain vinyl groups. It will be noted that, in all cases, liners based on these silicones were unsatisfactory, whether or not an enhancement step was carried out.

TABLE V

| Example Comparison | Enhanced? | Silicone Polymer | Release Value, g/cm. Width Initial | After Activation |
|---|---|---|---|---|
| I | Yes | $CH_2=CHSiO\begin{pmatrix}CH_3\\\|\\SiO\\\|\\CH_3\end{pmatrix}\begin{pmatrix}CH_2\\\|\\SiO\\\|\\CH_3\end{pmatrix}_{122}\begin{pmatrix}CH_2\\\|\\SiO\\\|\\CH=CH_2\end{pmatrix}_3\begin{matrix}CH_3\\\|\\Si-CH=CH_2\\\|\\CH_3\end{matrix}$ | 7.1 | 49.6 |
| I | No | (same as above) | 3.7 | 55.1 |
| J | Yes | $CH_2=CHSiO\begin{pmatrix}CH_3\\\|\\SiO\\\|\\CH_3\end{pmatrix}\begin{pmatrix}CH_3\\\|\\SiO\\\|\\CH_3\end{pmatrix}_{124}\begin{pmatrix}CH_3\\\|\\SiO\\\|\\CH=CH_2\end{pmatrix}\begin{matrix}CH_3\\\|\\Si-CH=CH_2\\\|\\CH_3\end{matrix}$ | 4.9 | 34.3 |
| J | No | (same as above) | 5.7 | 77.6 |
| K | Yes | $CH_2=CHSiO\begin{pmatrix}CH_3\\\|\\SiO\\\|\\CH_3\end{pmatrix}\begin{pmatrix}CH_3\\\|\\SiO\\\|\\CH_3\end{pmatrix}_{119}\begin{pmatrix}CH_3\\\|\\SiO\\\|\\CH=CH_2\end{pmatrix}_6\begin{matrix}CH_3\\\|\\Si-CH=CH_2\\\|\\CH_3\end{matrix}$ | 4.0 | 32.4 |
| L | Yes | $CH_3SiO\begin{pmatrix}CH_3\\\|\\SiO\\\|\\CH_3\end{pmatrix}\begin{pmatrix}CH_3\\\|\\SiO\\\|\\CH_3\end{pmatrix}_{114}\begin{pmatrix}CH_3\\\|\\SiO\\\|\\CH=CH_2\end{pmatrix}_{11}\begin{matrix}CH_3\\\|\\Si-CH_3\\\|\\CH_3\end{matrix}$ | 4.8 | 38.0 |

What is claimed is as follows:

1. A release liner which, even after exposure to natural or artificial light in the presence of moisture vapor, displays release properties of less than 20 g/cm width with respect to normally tacky and pressure-sensitive adhesive tape, said liner comprising a self-supporting sheet material having bonded to at least one face, a thin layer comprising noble metal and cured silicone polymer having substantially no residual ethylenic unsaturation and being the platinum-catalyzed reaction product of solvent-free liquid components consisting essentially of (1) terminally unsaturated polydimethylsiloxane having the structural formula $$R_{4-a}Si[OSi)_bOSi-R^2]_a$$
(with R, R on upper positions and R, R¹ on lower positions)

in which a is 2, 3, or 4, b is 15-100, R and R¹ are monovalent hydrocarbon radicals free of aliphatic unsaturation, at least 50 mole percent of said radicals being methyl and the remainder being alkyl, cycloalkyl, aryl or aralkyl, and R² is a monovalent ethylenically unsaturated aliphatic hydrocarbon radical having 2 to 6 carbon atoms and (2) polymethylhydrosiloxane crosslinking agent having the empirical formula $$R^3_cH_dSiO_{(4-c-d)/2}$$

in which $R^3$ is bonded to a silicon atom and is a monovalent aliphatic or aromatic hydrocarbon radical or the halogenated derivative of such a radical, c is 0 to 3, and d is 0.005 to 2.0, the sum of c plus d being 0.8 to 3, there being at least 2 silicon-bonded hydrogen atoms present per molecule, the ratio of silicon-bonded hydrogen in (2) to silicon-bonded ethylenically unsaturated radicals in (1) being from 1:1 to 20:1.

2. The release liner of claim 1 wherein each side of the base sheet is provided with a silicone layer of the type defined.

3. The release liner of claim 1 wherein R and $R^1$ are both methyl.

4. The release liner of claim 1 wherein $R^2$ is a vinyl radical.

5. The release liner of claim 4 wherein b is from 25 to 75.

6. The release liner of claim 5 wherein c is from 0.5 to 2.0.

7. The release liner of claim 6 wherein the ratio of silicon-bonded hydrogen to silicon-bonded ethylenically unsaturated radicals is from 1.1 to 2.5.

8. The method of making the release liner of claim 1 comprising the steps of a. blending solvent-free silicone polymer having the empirical formula

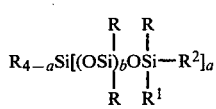

in which a is 2, 3, or 4, b is 15–100, R and $R^1$ are monovalent hydrocarbon radicals free of aliphatic unsaturation, at least 50 mole percent of said radicals being methyl and the remainder being alkyl, cycloalkyl, aryl or aralkyl; and $R^2$ is a monovalent ethylenically unsaturated aliphatic hydrocarbon radical having 2 to 6 carbon atoms, with platinum catalyst in an amount equal to 10 to 200 parts of platinum per 1,000,000 parts of polymer, b. maintaining the blend of polymer and catalyst at a temperature between 20° and 80° C. for a time between 5 minutes and 2 hours, sufficient to cause association of the platinum with the vinyl groups of said polymer, c. mixing into said blend a solvent-free silicone crosslinking agent having the empirical formula $$R_c H_d SiO_{(4-c-d)/2}$$

in which R is bonded to a silicon atom and is a monovalent aliphatic or aromatic hydrocarbon radical or the halogenated derivative of such a radical, c is 0 to 3, and d is 0.005 to 2.0, the sum of c plus d being 0.8 to 3, there being at least 2 silicon-bonded hydrogen atoms present per molecule, the ratio of silicon-bonded hydrogen in (2) to silicon-bonded ethylenically unsaturated radicals in (1) being from 1:1 to 20:1, to obtain a coating composition having a viscosity in the range of 100–1,000 cps, d. coating a thin layer of said formulation on a self-supporting backing sheet, and e. heating the coated sheet for a time and temperature sufficient to effect cure by reaction of the polymer and the crosslinking agent.

9. The method of claim 8 wherein a cure inhibitor is incorporated in the coating composition to extend pot life, said inhibitor being of a type which is rendered inoperative by the heat employed in the curing step.

10. The method of claim 8 or 9 wherein the catalyst provides 50 to 150 parts of platinum per 1,000,000 parts of polymer.

* * * * *

UNITED STATES PATENT AND TRADEMARK OFFICE
CERTIFICATE OF CORRECTION

PATENT NO. : 4,386,135
DATED : March 31, 1983
INVENTOR(S) : Karen J. Campbell and Jack L. Evans It is certified that error appears in the above—identified patent and that said Letters Patent is hereby corrected as shown below:

Col. 2, line 60, after the first "[" in the formula there should be a Parenthesis ( .

Col. 3, Line 35, after the first "[" in the formula there should be a parenthesis (.

Col. 4, line 63, the word "support" should be -- superior --

Col. 10, line 5, after the first "[" in the formula there should be a parenthesis (.

Signed and Sealed this

Eighth Day of November 1983

[SEAL]

Attest:

Attesting Officer

GERALD J. MOSSINGHOFF

Commissioner of Patents and Trademarks